Figure 8:
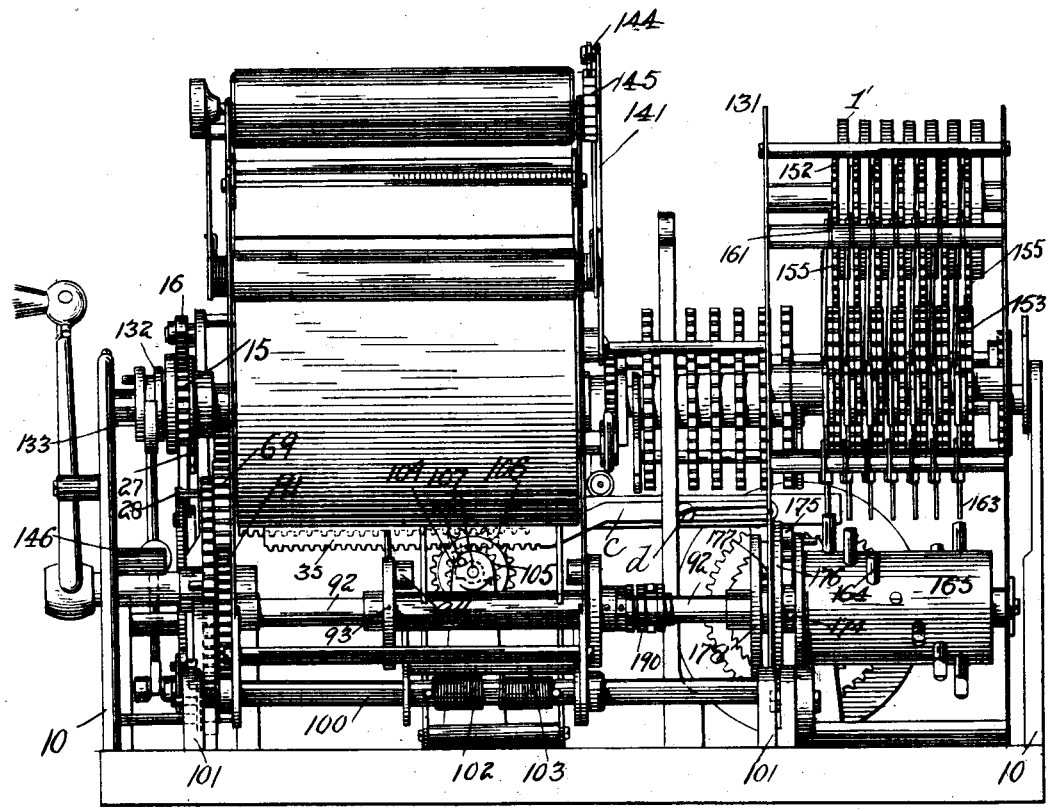

No. 712,777. Patented Nov. 4, 1902.
G. W. & A. L. DUDLEY.
RECORDING AND ADDING MACHINE.
(Application filed Mar. 24, 1900.)
(No Model.) 7 Sheets—Sheet 1.
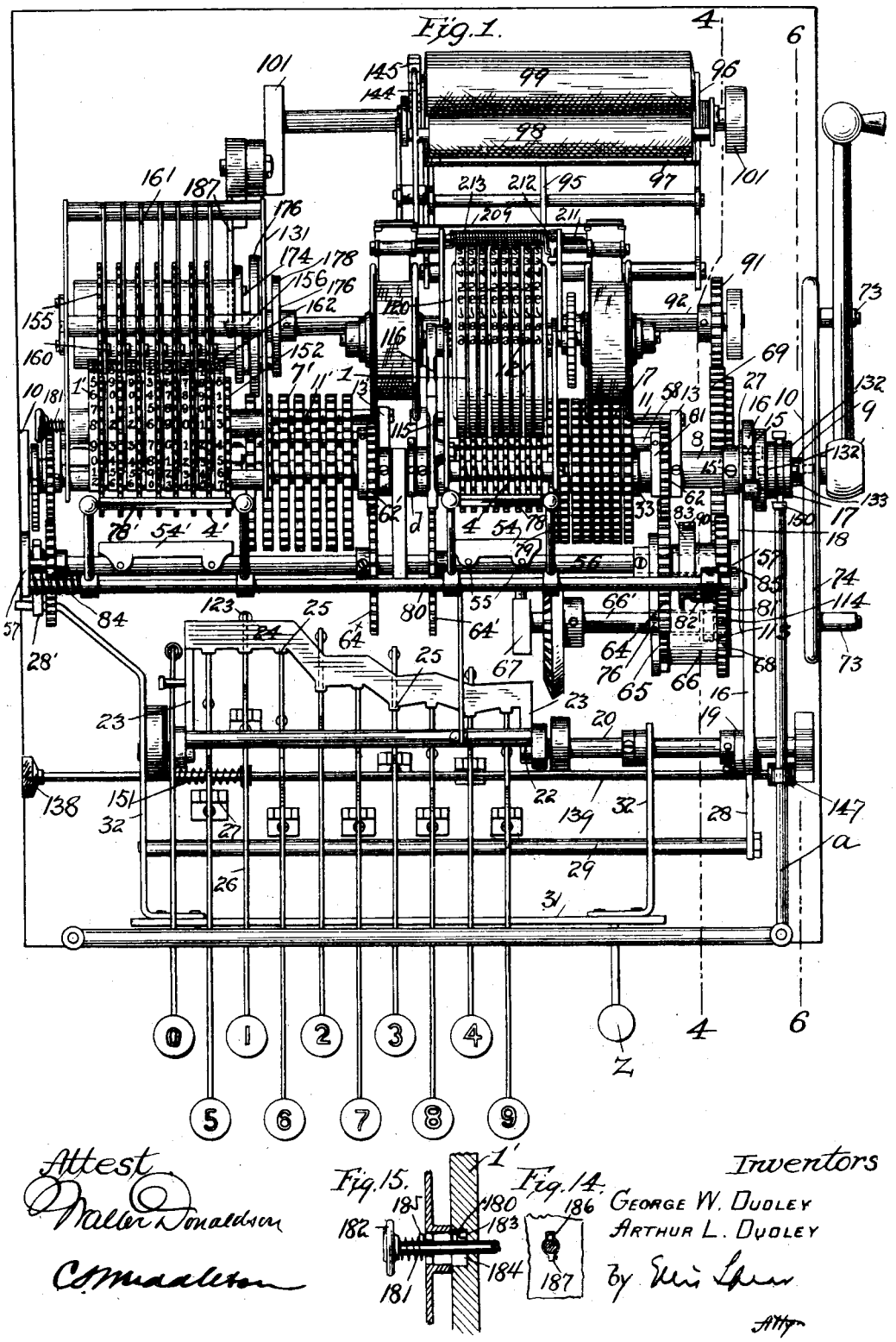

No. 712,777. Patented Nov. 4, 1902.
G. W. & A. L. DUDLEY.
RECORDING AND ADDING MACHINE.
(Application filed Mar. 24, 1900.)
(No Model.) 7 Sheets—Sheet 2.
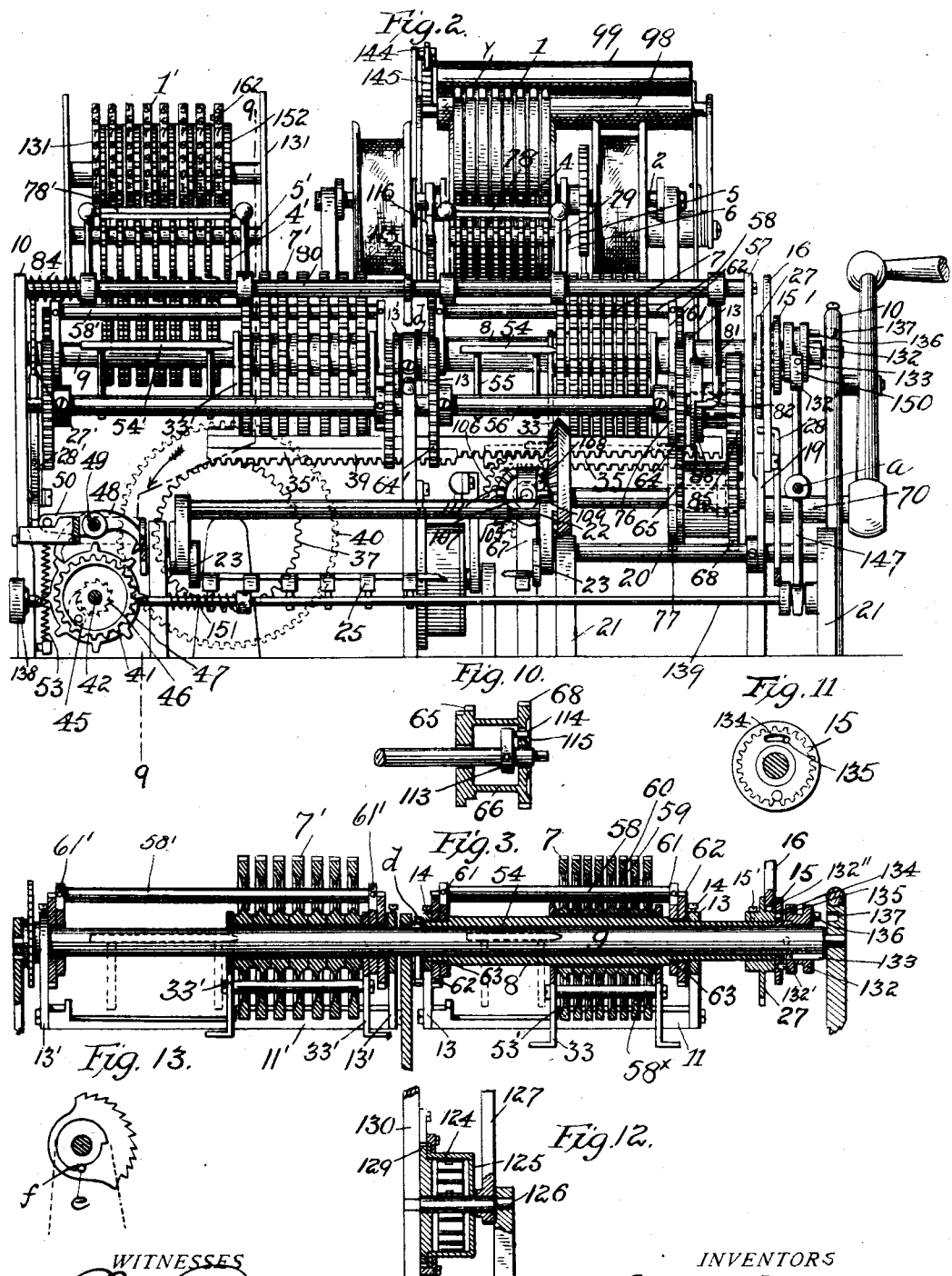
WITNESSES
INVENTORS
GEORGE W. DUDLEY
ARTHUR L. DUDLEY
by　Attorney No. 712,777. Patented Nov. 4, 1902.
G. W. & A. L. DUDLEY.
RECORDING AND ADDING MACHINE.
(Application filed Mar. 24, 1900.)
(No Model.) 7 Sheets—Sheet 3.
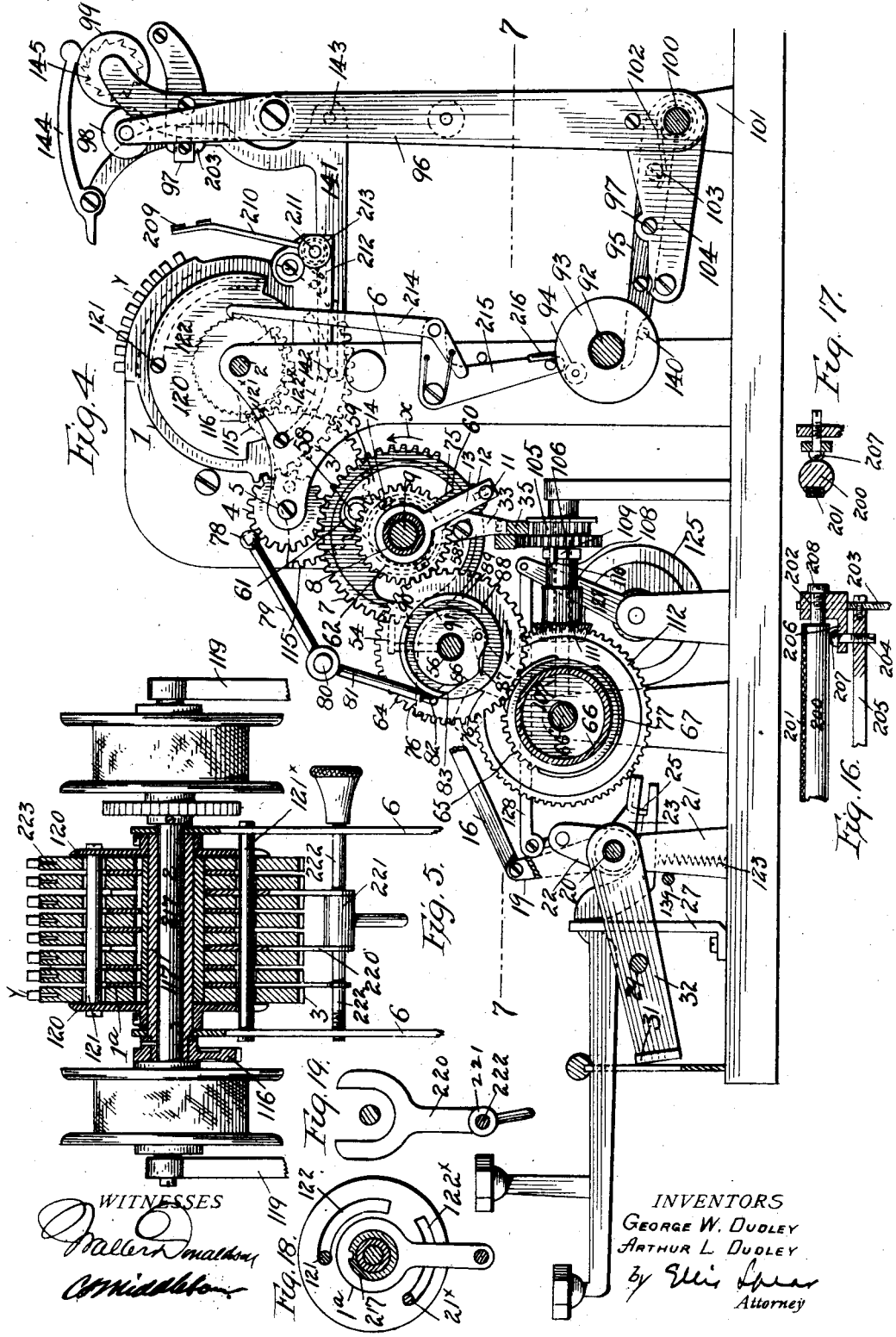
INVENTORS
GEORGE W. DUDLEY
ARTHUR L. DUDLEY
by Ellis Spear
Attorney

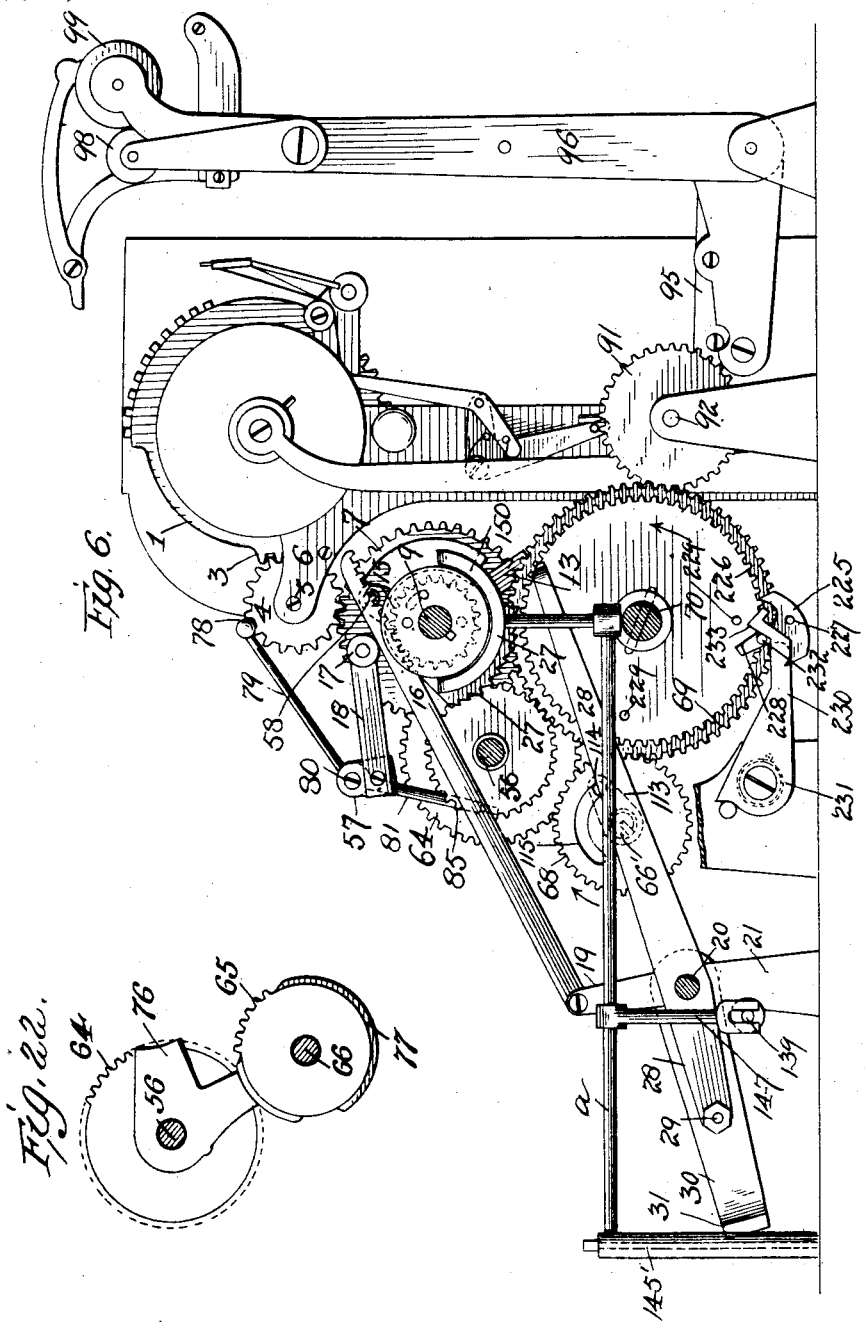

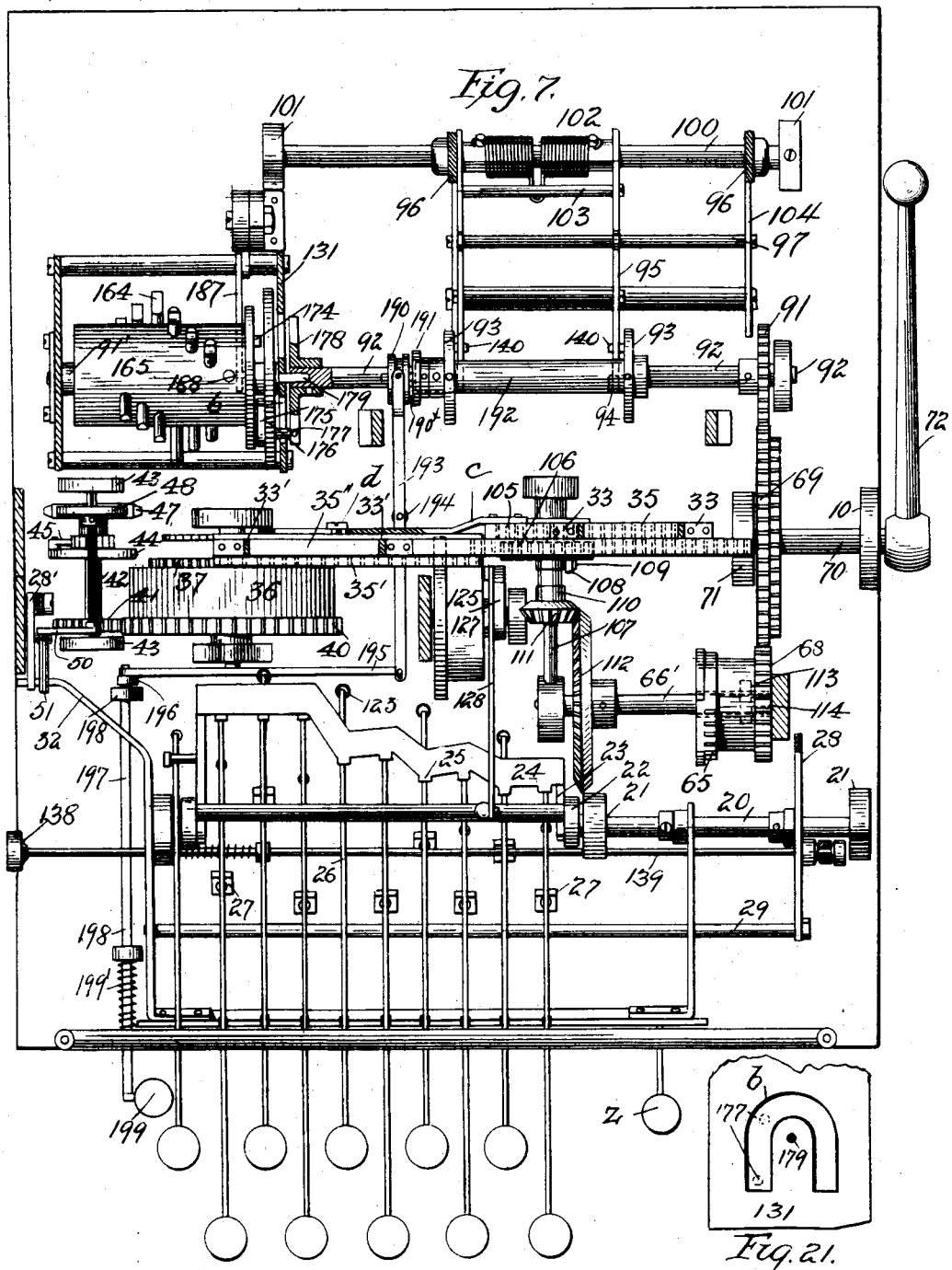

No. 712,777. Patented Nov. 4, 1902.
G. W. & A. L. DUDLEY.
RECORDING AND ADDING MACHINE.
(Application filed Mar. 24, 1900.)

(No Model.) 7 Sheets—Sheet 6.

INVENTORS
GEORGE W. DUDLEY
ARTHUR L. DUDLEY

No. 712,777. Patented Nov. 4, 1902.
G. W. & A. L. DUDLEY.
RECORDING AND ADDING MACHINE.
(Application filed Mar. 24, 1900.)

(No Model.) 7 Sheets—Sheet 7.

WITNESSES
INVENTORS
GEORGE W. DUDLEY
ARTHUR L. DUDLEY
By
Attorney

UNITED STATES PATENT OFFICE.

GEORGE WILSON DUDLEY AND ARTHUR LOUIS DUDLEY, OF STAUNTON, VIRGINIA, ASSIGNORS TO THE NUMEROGRAPH MANUFACTURING COMPANY, OF CHARLESTON, WEST VIRGINIA, A CORPORATION OF WEST VIRGINIA.

RECORDING AND ADDING MACHINE.

SPECIFICATION forming part of Letters Patent No. 712,777, dated November 4, 1902.

Application filed March 24, 1900. Serial No. 10,105. (No model.)

*To all whom it may concern:*

Be it known that we, GEORGE WILSON DUDLEY and ARTHUR LOUIS DUDLEY, citizens of the United States, residing at Staunton, Augusta county, Virginia, have invented certain new and useful Improvements in Recording and Adding Machines, of which the following is a specification.

Our invention relates to machines for recording and adding numbers, such as those used in banks for listing checks and notes and adding and recording the items thereof and for like purposes. We have sought in this machine to simplify the mechanism and to render it certain in its operation.

We have provided by our invention a machine having only ten keys, corresponding to the digits "1," "2," "3," &c., and capable of printing or printing and adding any desired numbers without special adjustment of the parts and by simply striking the keys in the order that the digits occur, reading from the left of the number, and without previously determining the denomination of the number or numbers to be printed or added.

Our machine comprises a series of printing-disks or type-carriers, one for each numerical order, arranged side by side, a series of selecting and setting-up disks, one for each type-carrier disk, a series of keys having connections to the selecting and setting-up disks, by which when the keys are struck the selecting-disks will be moved into proper position to select the digits desired, and means for setting up the selected type to the printing-point.

In the operation of our machine the selecting action takes place as the keys are struck in succession and the setting-up action takes place after the desired number of digits have been selected and by a simultaneous operation of the several setting-up devices and of the type-carriers. The operator has only to strike the keys in succession corresponding to the digits, reading from the left of the number, in order to cause the selecting action to take place, and then by one operation of a hand-lever the selected type are simultaneously set up at the printing-point and the impression is taken.

The adding mechanism of our machine comprises, like the printing or listing mechanism above referred to, a series of numeral-disks and a set of selecting-disks which are moved step by step to be thrown into engagement with the numeral-disks, and the addition is effected by a simultaneous action of the several numeral-disks resulting from the operation of the hand-lever before mentioned which is imparted to the disks through the selectors. The setting-up action of both the printing and adding disks is effected positively through the manipulation of the hand-lever, and the carrying devices of the adding mechanism are also operated positively through connections leading from the hand-lever.

All the operations of the various parts of our machine are carried out by simply manipulating the keys to set the selecting devices and by operating the hand-lever forward and backward, the first-mentioned movement effecting the setting-up action, return of selecting device to disengaged position, and the printing and the backward movement causing the resetting of the setting-up device to normal position, the return of the type-carriers to zero, and causing also the positive operation of the carrying devices of the adding mechanism whereby digits are carried from one numerical order to the next.

Our invention consists in the features of structure and arrangement and combination of parts hereinafter referred to.

Figure 9:
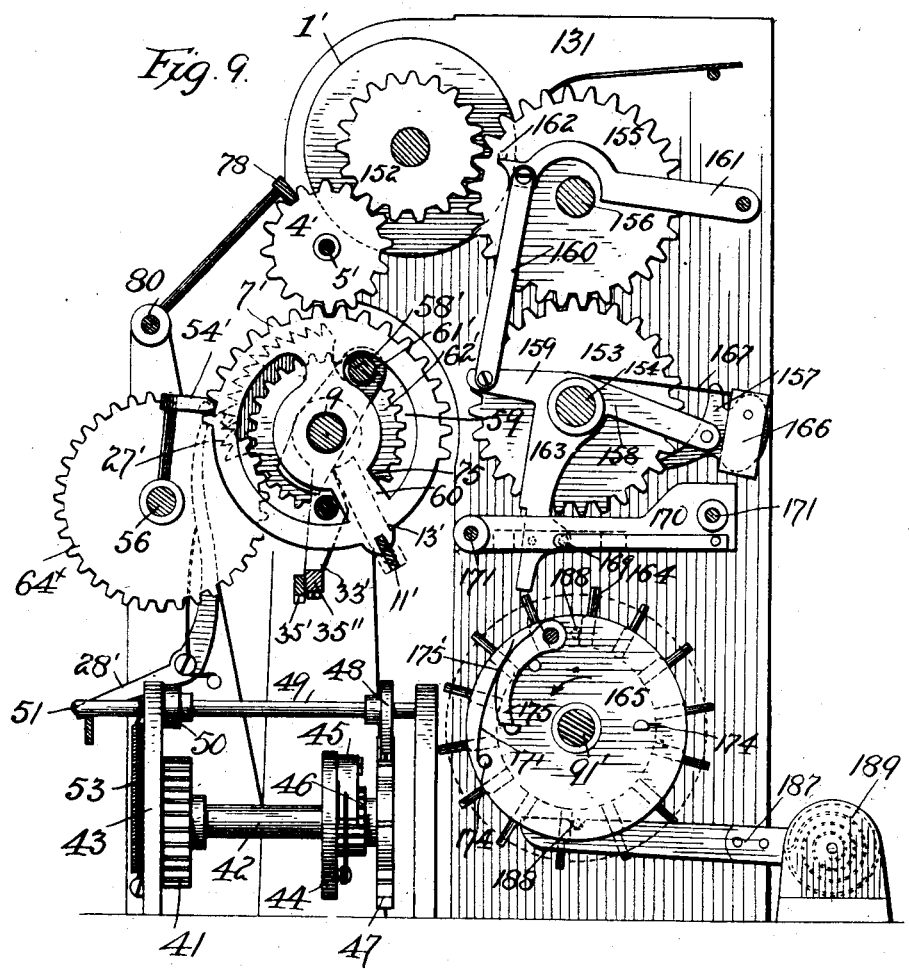
Figure 20:
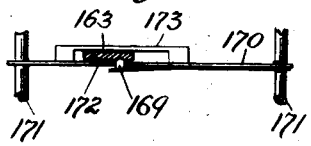

In the accompanying drawings, Figure 1 is a plan view of the machine; Fig. 2, a front elevation with some of the key mechanisms and frame parts omitted and with parts broken away. Fig. 3 shows a longitudinal section along the selecting or setting-up mechanism with the selecting-disks in section. Fig. 4 is a section on line 4 4 of Fig. 1. Fig. 5 is a sectional view through the type-carriers or printing-disks, some of the parts being shown in side elevation. Fig. 6 is a sectional view on line 6 6 of Fig. 1. Fig. 7 is a plan view on line 7 7 of Fig. 4. Fig. 8 is a rear view of the machine. Fig. 9 is a sectional view on line 9 9 of Fig. 2, some of the parts being omitted. Figs. 10, 11, 12, and 13 are views of detail parts. Figs. 14 and 15 are detail views relating to means for resetting the adding-disks. Figs. 16 and 17 are detail views relating to the printing-platen. Figs. 18 and 19 are detail views showing means for separating the printing-disks. Fig. 20 is a detail view relating to the adding mechanism. Fig. 21 is a view of a detail. Fig. 22 is a detail view for locking part of the mechanism against movement.

In the drawings the type-carriers 1 are shown in the form of disks supported from a shaft 2 to turn loosely about the same, certain sleeves being interposed, as will be hereinafter pointed out. We have shown only eight of these type-carrying disks, though more or less may be used. The type $y$ are arranged partly around the periphery of each, the cipher being arranged one space away from the printing-point and the numerical value of the characters on each carrier increasing in regular order up to number "9." The arrangement and location of the type on one disk are similar in all respects to those on each of the other disks, each carrier representing one of the numerical orders—units, tens, hundreds, &c.

Each disk carrier has a series of teeth 3 on its periphery, forming a segment of a gear, and by these the type-carrier disks are operated to bring the desired type opposite the printing-point. For this purpose each type-carrying disk has meshing with its segment-teeth 3 a gear 4, which is journaled to turn loosely on a shaft or pin 5, supported in the standards or arms 6, which also support the shaft or pin of the type-carriers and extend up from the base of the machine. These gears are arranged to be engaged and operated by selectors or setting-up segments 7 in the form of toothed wheels or segments supported loosely on a hollow shaft or sleeve 8, Figs. 1, 2, 3, and 4, carried by a shaft 9, which extends from side to side of the machine and is journaled in the side standards 10. These selectors are eight in number, corresponding to the number of type-carrying disks, and they lie normally out of engagement with the gears 4 and in a group to one side—i. e., to the right of the group of gears.

When a key is operated, the whole group of selectors is rotated a distance corresponding to the number character of said key, as will be described hereinafter. For instance, if key bearing the number "2" is struck the group of selectors will rotate a distance equal to three tooth-spaces, because the figure "2" stands three spaces away from the printing-point, the cipher, as before stated, being located one space above the printing-point. This rotation of the group of selectors takes place toward the front in the direction of the arrow $x$ in Fig. 4, and as they complete their rotation they are given as a group a lateral movement one step along the shaft 9 to bring the first selector at the left of the group into engagement with the first gear 4 at the right of the group of gears, and then by giving the engaged selector a return or backward rotation, as will be hereinafter described, to normal position it will through the gear 4 turn the type-carrying disk to bring the figure "2" to the printing-point. In printing the number "2345," for instance, it is only necessary to press the keys "2," "3," "4," "5" in the order named. When the "2" key is pressed, the operation above described will take place. When the "3" key is pressed next in order, all of the disengaged selectors or set-up disks will rotate forwardly a distance corresponding to the space between the printing-point and the type bearing the character "3" on the type-carrying disks, and at the completion of this forward rotation the whole group of selectors or set-up disks will make another step leftward or longitudinally of the shaft 9, the first selector now engaging the second gear-wheel 4 and the second selector engaging the first gear 4, which has just been left by the first selector. When keys numbered "4" and "5" are pressed in succession, actions similar to those described take place, the whole group of selectors, excepting the first two, which are now engaged with the gears 4, rotating forwardly distances corresponding, respectively, to the distances or spaces the type "4" and "5" lie from the printing-point, the rotary movement for the key numbered "5" being greater than that for the other keys "4," "3," and "2," and after each rotary action the described lateral shifting movement of the selectors takes place along the shaft, so that when the "5" key is struck there will be four selectors engaging the first four gears, counting the latter from the right, and each selector will have been rotated or displaced from normal position previous to engaging the pinions an amount equivalent to its numerical value. Now if all the selectors are rotated back to normal position the one which has been displaced farthest from normal position will have to perform a greater movement than the one which is only displaced the distance, say, of three tooth-spaces, and it will therefore be clear that upon the rotation of the selectors back to normal position different degrees of movement will be imparted to the type-carrying disks through the gears, and thus the figures "2345" will be brought to the printing-point, and this "setting-up" action takes place simultaneously. Briefly stated, the selectors are rotated forwardly or displaced a number of spaces corresponding to the value of the key struck, and after having rotated they move laterally into mesh with the gears, to be thus placed in operative connection with the type-carrying disks to roate the same when the selectors are all rotated back to normal position. After having printed one row of figures or one figure, as will be hereinafter described, the whole group of selectors are moved laterally to their disengaged position at the right of the group of gears, and this action follows their rotation back to normal position, as will be described hereinafter.

From the above it will be seen that it is not necessary to determine the denomination of the number before striking the keys. Only ten number-keys are necessary in the machine, and it is not necessary to provide a set of keys for each numerical order. In printing the number "2345" when the digit "2" is struck this will be selected in the order of units. When the "3" key is struck, this action will cause the "2" digit to be moved or transferred, so to speak, to the tens place, and when keys "4" and "5" are struck the "2" digit will be, in effect, transferred to hundreds place and then to the thousands place, and it is only necessary, therefore, to strike the keys in the order of the digits reading from the left of the number without regard to the denomination of the number, and when the last key is struck all the selectors will be in their proper places ready for the setting-up action.

For giving the selecting-segments or set-up disks their first movement—i. e., their forward rotation—we provide a bar 11, having a splined connection, as shown in Figs. 1, 3, and 4, with the peripheries of the several selector-segments at 12. This splined bar is carried by arms 13, which are secured by set-screws 14 to the sleeve 8 on the shaft 9. There is one of the arms 13 at each side of the group of selector-segments, and the spline-bar extends between them, being thus held at each of its ends and maintained in proper position.

The hollow shaft or sleeve has secured thereto by a screw 15', Fig. 3, a gear or segment 15, with which engages a rack-bar 16, which is held in engagement by a roller 17 on a bracket 18.

The rack-bar is operated by an arm 19 on a rock-shaft 20, which is journaled in posts 21 on the base-plate. The rock-shaft is cranked at 22, Figs. 1, 2, and 4, and at the ends of this cranked portion arms 23 are secured, being adapted to turn about the axis of the main part 20 of the rock-shaft. These arms carry at their rear ends a plate or bar 24, Figs. 1 and 7, of irregular form, so as to locate the contact or bearing points or lips 25 at different distances from the axis of the rock-shaft.

The key-levers 26 are fulcrumed in standards 27, extending up from the base, and these fulcrums are differently located with relation to each other and the tilting bar 24, this relation, together with the relative positions of the contact-points 25 of the tilting bar, being such as to impart from the key-levers a differential movement to the tilting bar and the rock-shaft, and consequently to the rack and gear or segment 15, so that if the "9" key is depressed the movement of the gear or segment 15 will be greater than if the "8," "7," or "6" key were depressed. When a key is depressed, therefore, the rack and segment are operated to the proper degree, and the sleeve 8 being rotated the spline-bar 11 will rotate the selector or set-up disks or wheels forwardly to get in proper position for their lateral shifting. In order to prevent "overthrow" of the parts, a segment 27, Figs. 2 and 6, of a ratchet is fixed to the sleeve 8, and this is engaged as the movement is completed by a detent-lever 28, pivoted on the rock-shaft 20 and connected to a cross-bar 29, Figs. 1, 6, and 7, of a space-frame which comprises a bar 31, extending under the key-levers to be operated thereby, and arms 32, extending rearwardly and journaled on the rock-shaft 20. The space-bar is constructed and arranged to be depressed as the key completes its stroke, and the detent-lever is timed to avoid all danger of overthrow. A second detent-lever 28', Figs. 1, 2, and 9, is pivoted to the left-hand standard 10, and this engages a second ratchet-segment 27', fixed on the shaft 9. The lever 28' is operated by the extension of the arm 32 of the space-frame located at the left of the machine.

Having thus described the first or forward rotary movement of the selectors or set-up disks resulting from the depression of a key, we will now describe the second movement performed by said parts as resulting from the same key action which causes the first movement. This second movement of the selectors is laterally as a group or in a direction longitudinally of the shaft 9, this occurring as soon as the selectors have completed their forward rotation and have gotten in proper position to engage the gears 4, and this lateral shifting of the group of selectors takes place on the same stroke of the key which causes the rotation of the selectors and in the final part of said stroke, it being understood that the lateral shifting takes place step by step until all the keys representing all the digits of the number have been struck. For this purpose the group of selectors is confined between posts or brackets 33, Figs. 3, 4, and 7, said selectors being loose on the sleeve 8, which sleeve the upper ends of the brackets 33 embrace loosely. These brackets are provided with right-angular foot portions, Fig. 3, which are secured by pins, Fig. 7, to a rack-bar or carriage 35, which is connected with and controlled by escapement mechanism similar to that employed on typewriting machines and comprising a spring-drum 36, Figs. 2 and 7, having connected therewith a gear 37, said gear meshing with the teeth of the section 35' of the rack-bar 35. The spring-drum has a gear-wheel 40 connected therewith, which meshes with a gear 41 on an escapement-shaft 42, which bears in posts 43, Figs. 2, 7, and 9. The shaft has fixed thereto a disk 44, which carries a pawl 45, and this engages a ratchet 46, which is rigidly connected to an escapement-wheel 47, loose on the shaft 42. The arrangement of the parts is such that the spring in the spring-drum through the gearing tends to rotate the pawl-disk to the right with the escape-wheel; but this movement is prevented by a pallet 48, having two arms with a tooth on the end of each, said pallet being fixed to a rock-shaft 49, journaled in the posts 43 and having an arm 50 secured thereto, carrying a pin 51, overlying the arm 32 of the space-frame. The arm 50 is normally pulled downwardly by a spring 53. When now the selectors have been rotated forwardly and the key is completing its movement, the space-bar 31 will be depressed, raising the arm 32, and thus through the rock-shaft 49 the pallet will be operated to permit the escapement mechanism to rotate one step, and thus operate the rack or carriage bar and move the group of selectors one step to the left to bring the first selector and first gear 4 into engagement. The rack-bar 35 is formed in sections for a purpose hereinafter explained, but it is sufficient for the description at this point to say that the operation of the escapement mechanism through suitable rack connections to the bracket 33, serves to move the group of selectors step by step upon the depression of the keys in succession.

The upper ends of the standards 33, which embrace the sleeve, slip loosely along the same.

The arms 13, carrying the spline-bar 11, have rotary movement only, and they are not displaced longitudinally of the shaft, and thus when the group of selectors is moved one step laterally that one of the group which engages a gear 4 leaves the spline part at 53', Fig. 3, and is thus freed from said spline-bar, which may then be returned to normal position on the rise of the key-lever, carrying back with it all the other selectors to normal position. The selector which has been thrown into engagement with the gear 4 and is freed from the spline-bar is, however, held against return movement or rotary displacement by a spline-plate 54, Figs. 1, 2, 3, and 4, supported on posts 55, extending from a shaft 56, journaled in the posts 57. This spline-plate is thrown out of connection with the selectors at the moment they are to be operated back to normal position to move the type-carriers, as will be more particularly referred to hereinafter. As soon as the selector leaves the spline-bar it engages the gear 4 and the spline-plate 54, so that it is still held against undue displacement and against returning to normal position with the rest of the selectors. When the next key is depressed, the same action is gone through the remaining selectors rotating forward and then shifting laterally to bring the next or second selector into engagement with the first of the gears 4, and in this lateral shifting movement the first selector will simply move from the first to the second gear 4, occupying the same relation to said second gear as it did to the first, and this is, in effect, the same as shifting the digit first selected from the units to the tens place. Each selector therefore as it leaves the spline-bar engages a gear 4 and the spline-plate. Supposing there are only two figures in the number and that the selectors have been moved, as described, so that two of them are engaging the two first gears 4 and all the others have been returned to normal position, the next action is to turn the two displaced selectors back to normal position, and in doing so to move the gears 4 and the type-carrying disk the required amount to bring the desired figures to the printing-point, whereby the selected digits will be "set up" at the printing-point simultaneously. For this purpose a pick-up bar 58, Figs. 3 and 4, extends parallel with the shaft supporting the selectors and through the opening 59 between the radial arms 60 of said selectors. The pick-up bar is carried by arms 61, rigidly fixed to gears or segments 62, which turn loosely on the sleeve 8, said sleeve having shoulders at 63, Fig. 3, to hold the arms with the pick-up bar in proper position longitudinally of the sleeve and shaft. There is a gear 62 and arm 61 at each end of the pick-up bar, and said gears are engaged by gear wheels or segments 64 64', carried by and rocking the shaft 56, heretofore referred to.

The shaft 56 is turned by a segment of a gear 65, Figs. 1, 2, 4, and 10, carried by a drum 66, which is supported loosely on a shaft 66', supported in the standard 57 at the right of the machine and in a post 67. A gear 68, carried by this drum, meshes with a master-wheel 69, fixed on a short shaft 70, journaled in the standard 10 and in a post 71, Fig. 7. The shaft is turned by a hand-lever 72 at the right of the machine, which is oscillated between the stops 73, Fig. 1, on the frame. By drawing this hand-lever forwardly the master-wheel will turn the gear 68 with its drum, thus causing the gear-segment 65 to turn the gear 64 at the right of the machine, and thus through the gears 62 and arms 61 will move the pick-up or set-up bar 58 from the position shown in Fig. 4 rearwardly, and those selectors which stand in advanced position will be rotated backwardly to normal position simultaneously by the pick-up bar coming in contact with the edge 75, Fig. 4, of their radial arms 60, and in so doing the engaged gears 4 and the corresponding type-carrying disk or disks will be moved to carry the selected characters to the printing-point. The gear 64 at the right of the machine is, as before stated, secured to the shaft 56, and thus said shaft turns with the gear, and therefore the spline-plate 54 is removed from the selector or selectors as the same begins to rotate. The spline-plate fits loosely between the teeth of the selectors, and there is no danger of the same preventing the free movement of the selectors, and this effect is also secured by having slight lost motion of the pick-up bar as it begins to operate.

When the parts have been operated to set up the whole series of selected type by one operation in front of the printing-point, the transmitting or setting-up train is locked in position by means of a locking-arm 76, Figs.

1 and 2 and dotted lines in Fig. 4, fixed to the gear 64 and having a curved bearing end adapted to fit a locking-rib 77 on the drum 66, and as the segmental teeth 65 leave the teeth of the gear 64 the curved end of locking-arm 76 comes in contact with the locking-rib 77 of the drum and holds all the transmitting or setting-up connections locked with the proper type set up opposite the printing-point. It will be understood that the pick-up bar engages the selectors which have been advanced or set up in succession, according to the position they have assumed by the operator striking different keys, and the selected type arrive simultaneously at the printing-point.

The locking devices just described remain in engagement while the printing is being effected, as will be described hereinafter.

The transmitting-gears 4 are held in proper position while inactive by a detent-bar 78, Figs. 1, 2, 4, and 6, which is carried by arms 79, fixed to a rock-shaft 80, bearing in the standards 57. A spring 84, Figs. 1 and 2, tends to move the detent-bar out of engagement with the pinions. For controlling and operating this detent an arm 81 on the shaft 80 has a pin 82, bearing on the face of a cam 83, which is connected with a gear 85, turning loosely on the shaft 56. The gear is in mesh with the master-wheel 69, and when the hand operating-lever 72 is drawn forward and the master-wheel turns the cam 83, rotating with the gear 85 in the direction of the arrow, Fig. 4, will bring its low part 86 to the pin 82, which will ride down the same, thus allowing the spring 84 to turn the rock-shaft and withdraw the detent-bar 78 from the gear 4, so that they are free to turn and transmit the motion from the pick-up or set-up bar to the type-carrying disks. As the cam continues to turn, the pin 82 engages and throws back the latch 87, pivoted in the cam-path, and the end of said latch then rests upon the high point 88 of the cam, Fig. 4, and this occurs immediately after the transmitting mechanism has set the type to the printing-point. The pin 82, riding over the latch to the high point 88, throws the detent-bar 78 into the gears 4, so that they and the type-carriers will be held against displacement while the printing is being done, the impression being taken slightly before the hand-lever 72 reaches its extreme forward position. As the hand-lever completes its forward movement, the pin 82, riding upon the surface 89 of the cam 83, reaches an opening 90 in the cam-face and falls through said opening under tension of the spring 84 and allows the detent-bar 78 to rise from engagement with the gears 4, and the pin then lying in the cam-groove 91, as the cam moves in the direction opposite to that of the arrow, Fig. 4, (due to the return of the lever 72 to its rearward position,) will hold the detent-bar elevated during the backward movement of the hand-lever, and consequently during the return of the type-carriers and gears 4 to normal position. As the pin 82 moves along the cam-groove it strikes and swings the latch into the position shown and the pin when the lever is all the way back rests upon the high point, as shown, in Fig. 4, and the detent-bar is now in engagement with the gears, and they are now properly held in alinement for the next action. When the pin rides upon the surface 89 of the cam, as before explained, the detent-bar is engaging the pinions. This is during the final movement of the hand-lever forward and during the printing impression. At this time—i. e., the final forward movement of the hand-lever—the whole group of selectors is returned to the right along the shaft 9 and out of engagement with the gears, as will be described later, and the detent-bar 78 serves to hold the gears in proper position during this return, lining them all up, so that their teeth will not obstruct the lateral movement of the selectors.

From the above it will be seen that the detent-bar is lifted from the gears 4 as soon as the hand-lever moves forwardly. It remains up while the transmitting or setting-up train and type-carriers are turning, and then it moves into engagement while the printing is being done during the latter part of the forward movement of the hand-lever, and at the end of the forward movement of said hand-lever it raises from the pinions and remains up until the hand-lever is returned to its rearward position, during which time the type-carriers and transmitting mechanism are returned to their position of rest.

The detent-bar is raised from the gear 4 slightly in advance of the rotation of the latter, for the reason that the segmetal teeth 65 do not engage the gear-wheel 64 until after the master-wheel has turned three tooth-spaces and the gear 68 and cam have been set in rotation.

After the transmitting or setting-up mechanism, consisting of the gears 64, the selectors, and gears 4, has been operated to set the type to the printing-point and has been locked in position by the lock-arm 76, Figs. 1, 2, and 4, and locking-rib 77, the master-wheel, the gear 68, and its attached cam, and the drum carrying the segment 65, can have further movement in the same direction, as at this time the segment 65 has passed out of mesh with the gear 64, which is now locked.

The additional movement of which the master-wheel is capable is utilized to turn a gear 91, Figs. 1, 6, and 7, which controls the impression mechanism. This gear is fixed on a shaft 92, which has also connected thereto the disks 93, having rollers 94 to bear on the arms 95, connected to swinging standards 96, Fig. 4, which carry the platen-bar 97 and the paper-feed rollers 98 99.

The swinging standards are pivoted on a bar 100, Figs. 1, 4, 7, and 8, supported in studs 101, and the arms 95 are also pivoted on said bar and are under tension of a spring 102, which engages a cross-bar 103 of the arms 95 and tends constantly to lift them, and thus throw the platen and paper-rollers to their rearward limit, as shown in Fig. 4. The arms 95 are connected to the swinging standards 96 by a cross-bar 97, which is carried by lateral extensions 104 of the swinging standard. Through the master-wheel and gear 91 the platen is moved forward, and this takes place during the latter part of the forward movement of the hand-lever 72 and after the type have been set up, the impression-frame not moving until the roller 94 has been carried from the position shown in dotted lines in Fig. 4 around to contact with the lever-arm 95. The impression is completed as the hand-lever reaches its forward limit. As the hand-lever moves rearward the platen will leave the type before the type-carrying disks begin to move, this being due to the fact that the segment 65 does not engage the gear 64 until after the master-wheel has rotated the gear 91 an amount equal to three teeth.

For returning the group of selectors to their disengaged position at the right of the group of gears 4 we employ a pinion 105, Figs. 4, 7, and 8, engaging the section 35 of the rack-bar before described, and this pinion is connected with a gear-wheel 106, turning loosely on a shaft 107 and having a pin 108 projecting from its face in the path of a stud 109 on a sleeve 110, which is also loose on the shaft and has a beveled pinion 111, which meshes with a beveled gear 112, fixed on the shaft 66' before mentioned. An arm 113 is fixed on this shaft within the drum 66, and it has a pin 114 passing into a slot 115 in the side of the drum, Figs. 6 and 10. As the hand-lever is moved forward the gear 68, with the drum, is moved in the direction of the arrow, Fig. 6; but this movement is lost on the pin 114 and arm 113 until the end of the slot 115 reaches the pin, when the arm will be operated to turn the shaft and the beveled gear, the time during which this lost motion is occurring being occupied in the setting-up operation and the printing and the operation of the counting mechanism, as will be hereinafter described. The end of the slot strikes the pin when the hand-lever is about half-way forward, and as the hand-lever moves forward from its midway position the beveled gearing is turned and the stud 109 is brought against the pin 108 of the gear just after the setting-up operation has been accomplished, and as the hand-lever completes its forward movement the stud and pin will turn the gear to move the rack 35 to the right, and thus shift the selectors or set-up segments as a group toward the right and out of engagement with the gears 4. The detent-bar 78 holds the gears 4 properly lined up for this action. When the hand-lever is moved backwardly, the beveled gearing is operated and the stud 109 is returned to normal position. (Shown in Fig. 2.)

It will be understood that in the setting-up action when the rack 35 moves to the left the pin 108 will be brought step by step toward the stud 109, and the engagement of the stud and pin will occur at different times in the forward stroke of the hand-lever, according to the number of type set up to print the number desired.

The shifting of the selectors or setting-up segments to the right causes those which had been moved off from the spline or selecting bar 11 to be reëngaged therewith for the next selecting operation.

The spline-plate 54, as before stated, is moved away from the selectors by the rotation of the shaft 56 in the setting-up action and remains forward until the hand-lever is returned to its rearward position of rest. During the rearward movement of this hand-lever the detent-bar 78 is freed from the gears 4, which are then free to rotate, and the gear-wheel 64, being now unlocked and rotated by the reverse movement of the drum and segment 65, the shaft 56 is rotated to return the spline-plate to position in line with the spaces between the teeth of the selectors, and, further, the type-carriers and gears 4 are returned to normal position by the gear-wheel 64' on the shaft 56, a segment 115, pivoted to the left-hand bracket 6, and a segment 116, fixed to a sleeve 117, turning loosely on the shaft 2, Fig. 5, supported in the standards 6, said sleeve carrying fixed thereto the disks 120, which carry a pick-up bar 121. This bar extends through slots 122 in the type-carriers, and when the pick-up bar is moved toward the front of the machine, Fig. 4, it returns any carrier which may have been moved back to normal position. When the type are being set up, the pick-up bar 121 moves ahead of the type-carriers and is always in position to return the carriers which are set up.

The backward movement of the hand-lever causes the removal of the roller 94 from the arm 95, and the spring 102 returns the platen-bar and paper-rollers to normal position, the arms striking against the shaft 92, which act as a stop.

For insuring the complete return of the platen and paper-rollers to normal position a pin 140 is carried by the disk 93, which engages the under edge of the arm 95 and lifts the same, and this positive action is utilized to turn the paper-rollers by means of a forked lever 141, engaging a bar 142, supported in the framework, said lever being pivoted at 143 to the swinging standards 96 and carrying pivotally at its upper end a pawl 144, engaging a ratchet-wheel 145 on the shaft of the paper-feed roller 99. Each time the platen and paper-feed rollers are moved rearwardly the forked lever will be rocked and the paper fed.

When the hand-lever is returned to its rearward limit, the transmitting-train of the setting-up mechanism is held locked by a lock-arm 76', dotted lines, Fig. 4, carried by the gear 64 and acting in a manner similar to the lock 76, before described. The segment 65 at this time is out of mesh with the gear 64 and stands slightly away from the teeth of the gear 4, so that the master-wheel will turn three teeth before the gear 64 begins to move, and this permits the detent-bar 78 to be removed from the gears 4 previous to the setting-up action.

For returning the key-levers springs 123 are employed, while for returning the frame 24, the rack 16 and the "set-up" segments or selectors a spring 124 is used, Fig. 12, one end of which is secured to a drum 125, and the other end is secured to the shaft 126, which has fixed thereto an arm 127, connected by a link 128 with the cranked part 22 of the shaft 20. The drum has a ratchet 129, fixed thereto and engaged by a pawl on a post 130, thus allowing the drum to be turned to adjust the tension of the spring.

*Counting mechanism.*—The counting-disks 1' are operated by selectors 7', loosely carried on the shaft 9, before described, with which the selectors of the setting-up and recording mechanisms are combined. These selectors are arranged in a group and lie normally disengaged to the right of gears 4', carried loosely on a shaft or pin 5', supported in the side frames 131 of the counting or adding mechanism. The selectors 7' are turned or set up into position to engage the gears 4' by a selecting or spline bar 11', similar to that before described and carried by arms 13', fixed directly to the shaft 9, Fig. 3. The shaft 9 is rotated through a clutch 132, splined to the shaft at 133 and having a pin 132' entering an opening in a disk 132'', loose on the shaft 9, and having a slot 134, Figs. 3 and 11, to receive a pin 135 on the pinion 15, so that when the pinion is operated, as before described, through the rack 16 the shaft 9 will be turned to correspond with the value of the key and the selector will be turned to proper position and will then shift to engage the transmitting-gear 4'. The group of selectors 7' are confined between brackets 33', Figs. 2, 3, 7, and 9, secured to the section 35'' of the rack-bar or carriage 35, to which section the section 35', before mentioned, is fixed. The section 35'' has teeth engaging the larger gear-wheel 106, while the section 35 engages the smaller pinion 105, and this construction causes the section 35, operated through the pinion 105, to move a shorter distance at each action of the escapement than the section 35'', which moves with the section 35 and imparts the movement from the spring-drum 36 to the gear 106 and pinion 105. This differential movement of the two rack-sections or carriages 35 and 35'' causes the group of count-selectors 7' to move a greater distance at each step than the type-setting selectors, and this is necessary, because the counting or adding disks 1' are spaced farther apart than the type-carrying disks, owing to the arrangement of transmitting and carrying devices located between the counting-disks, as will be described. The bar 35 has a slotted arm c, and a screw d passes through the slot thereof into the section 35''. This arm forms a sliding and guiding connection between the sections 35 35'' of the rack-bar. The mechanism for setting up the number-disks to display the result of the addition is substantially similar to that described in connection with the listing or printing mechanism, the same consisting of gears 64$^\times$, fixed on the shaft 56, engaging gears 62' on the shaft 9, having arms 61' moving therewith and carrying a pick-up bar 58' to move the selectors by coming in contact with their radial arms.

The pin-and-slot connections 135 134, Figs. 3 and 11, between the pinion 15 and the disk 132'', which is connected with the clutch 132, allows the cipher-key to be operated to bring the cipher to the printing-point without affecting the counting or adding mechanism, the cipher of course not adding anything to the count. This lost motion takes place when any key is depressed—that is, the first tooth movement is not imparted to the counting mechanism, as it is necessary to bring the cipher to the printing-point—and the counting-train will then be affected only by the further movement to bring the digits "1," "2," "3," &c., to the printing-point.

When the amounts have been listed by the printing mechanism and the result of the addition appears on the count-disks, this result may be printed at the bottom of the list without affecting the position of the count-disks by throwing the clutch out of operation, for which purpose it is moved to the right to withdraw the pin 132' from the disk 132'', thus allowing the pinion 15 to turn to set up the type and print without affecting in any way the counting-train. When the clutch is thrown to the right, a pin 136 thereon engages an opening 137, Figs. 2 and 3, in the standard 10, and thus the counting-train is held locked against movement. The clutch is operated from a finger-piece 138, carried by a rod 139, arranged to slide in the posts extending up from the base. A rock-shaft a is supported in the post 145' and in the stud 146, projecting from the standard 10, said rock-shaft carrying an arm 147, the fork of which extends between collars on the rod 139. A clutch-fork 150 extends from the rock-shaft to engage the clutch. A spring 151 presses the rod 139 toward the right to keep the clutch in engagement with the disk 132''.

The count or adding disks 1' each has secured thereto a gear-wheel 152, Fig. 9, meshing with the gears 4', by which the adding-disks are rotated from the selectors 7'. We provide carrying mechanism for the adding-disks arranged to be operated positively by the movement of the hand-lever 72, and this mechanism comprises a toothed carrying-wheel 153, supported loosely on a shaft or pin 154, supported in the side frames of the counting mechanisms, the motion from said gear-wheel being transmitted to the gear 152 of the adding-disks by an intermediate gear 155, supported by a pin 156, which is in turn supported by the side frames of the count mechanism. The toothed wheel 153 is engaged by a pawl 157, which is carried by a lever 158, turning loosely about the pin 154, said lever having an arm 159, connected by a link 160 with a carrying-arm 161, which is pivoted to a pin supported in the frame and has its forward end extending into the path of a pin 162, carried by the next preceding adding-disk. This pin is shown in dotted lines in Fig. 9. When the carrying operation is to take place, the pin 162 on the units-disk is brought against the end of the carrying-lever 161 of the tens-disk and depresses the same, which through the link 160 turns the lever 158 and sets up the pawl 157 one notch on the toothed wheel 153. The lever 158 has also a depending arm 163, the lower end of which is by this setting-up action moved rearwardly, and is thereby thrown into the path of a pin, as 164, carried by the drum 165, which is fixed on a shaft 91', said shaft having its bearings in the side frames of the counting mechanism. This drum, as will be hereinafter described, is rotated forwardly in the direction of the arrow through positively-operated connections from the hand-lever when the same is moved back to normal position, and in this action the pin 164 of the drum will strike the depending arm 163 of the setting-up lever, turning the same and causing the pawl 157 to move the toothed carrying-wheel 153, which motion is transmitted through the intermediate gear 155 to the tens-disk through the gear 152 thereon. The pawl is held in position by means of a weight 166, secured thereto, and a spring 167. The carrying-lever and setting-up lever 158 are held in either position to which they may be moved by a spring-pin 169, supported on a partition-plate 170, supported on rods 171, said spring-pin fitting in depressions 172 in the lever. The lever is guided by a yoke 173 on the partition-plate, Fig. 20.

For operating the pin-drum 165 pins 174, Figs. 7 and 9, are carried thereby to be engaged by a pawl 175, pivotally carried by a disk 176, which is loose on the shaft 91' and connected by pins 177 with a disk 178, fixed to the shaft 92, which, as before described, is operated from the hand-lever through the master-wheel 69 and pinion 91. The arrangement is such that as the hand-lever is drawn forward the pawl will move toward the rear to engage the pin 174, and then upon the rearward movement of the hand-lever the drum will be turned forward by the said pawl in the direction of the arrow in Fig. 9. The drum-shaft 91' has a reduced extension 179, fitting an opening in the end of the shaft 92. This forms a bearing for the shaft 91' and permits the parts to be readily assembled. The pins 177 extend through an opening b, formed in the framework, Figs. 7 and 21.

It will be seen from the above that the operation of the carrying devices is not dependent upon the power of springs, but is accomplished through positively-operated mechanisms from the hand-lever. The pawl 175 is pressed by a spring 175'. The opening through which the pins 177 extend is shown in detail at b, Fig. 21, and the normal position of the two connecting-pins is shown in dotted lines in this figure.

In order to return the adding-disks to zero for a new operation, we provide a pin 180, Fig. 15, on the shaft which supports the disks, said shaft having longitudinal movement through its bearings in the side frames and being pressed normally toward the left by a spring 181. By pushing this shaft toward the right by means of a button 182 the pins 180, one for each disk, are brought into the path of pins 183, arranged in recesses 184 in the faces of the counting-disks, and by then turning the shaft toward the front the pins 180 will engage the pins 183 and reset the adding-disks to zero. The shaft is provided with a pin 185, which normally lies outside of the side frame; but when the shaft is moved to the right this pin passes through an opening 186, Fig. 14, which is just large enough to allow the passage of the pin, and as soon as the shaft begins to turn the pin will engage the inner face of the side frame, and thus hold the shaft in its shifted position with the pins 180 and 183 engaged until the shaft makes its half-revolution, when the pin will come opposite the second opening 187, and then the shaft will be moved to the left by the spring 181, the disks having at this time been reset. This insures the full movement of the parts when once said movement is started.

The pin-drum 165 makes one half-revolution in the direction of the arrow, Fig. 9, at each operation of the hand-lever toward the rear, and it is provided with two sets of pins, so that one set will coöperate with the carrying devices at each operation of the hand-lever. At each half-revolution of the drum a detent-lever 187 is arranged to engage either one of the pins 188, carried by the head of the drum to hold the same in position, the said detent being under tension of a spring 189, Fig. 9.

In order to prevent the printing when the adding mechanism alone is to be operated, we provide a clutch 190, Fig. 7, splined on the shaft 92 and having a pin 190×, adapted to engage a clutch member 191, fixed to the sleeve 192, which carries the disks 93, which control the swinging movement of the platen toward and from the type. The clutch is operated by a fork 193, pivoted at 194 and connected at its front end by a link 195 with an arm 196 on a shaft 197, supported in bearings 198, said shaft being operated by a key 199 and returned by a spring 199'. When the impression is not to be made, the operator by simply depressing the key 199 throws out the clutch 190, and thus prevents the swinging movement of the platen and paper rollers.

The platen, Figs. 16 and 17, comprises a bar 200, having a rubber facing-strip 201, the said bar being journaled in brackets 202, which are grooved on their upper and lower sides to fit in the forks 203 of the standards 96. The brackets are adjustable toward the front and rear by screw-studs 204, threaded into a cross-bar 205 and passing through the flange 206 of the bracket 202, the front ends of the studs having rounded or semispherical heads 207, bearing against the rear face of the platen-bar, which bar is cylindrical in form. By turning the studs the platen can be set forward or backward to get the proper impression, and by loosening the screws 208, which engage the journals of the platen-bar, the said bar may be turned so that a perfect impression will be secured over the whole extent of the type-face.

The frisket 209 is carried by arms 210, secured to a rock-shaft 211, journaled in arms of the standard 6, the said rock-shaft having an arm 212 fixed thereto, which is pressed upwardly by a spring 213, and thus the frisket is returned to the position shown in Fig. 4 after having been moved forward by the movement of the platen toward the type. The ribbon-spools are supported on the shaft 2, said shaft being turned by a ratchet thereon through a pawl 214, pivotally carried by a lever 215, pivoted to the standard 6, said lever 215 being operated by a pin 216 on the disk 93. Either spool may be fixed to the shaft in the well-known manner, so as to cause the ribbon to be wound from one spool to the other.

The count mechanism is provided with the spline-plate 54' and a detent-bar 78', which perform functions similar to those described in connection with the type-setting and printing mechanism.

The type-disks are separated from each other by washers $1^a$, Figs. 5 and 18, said washers being splined to a sleeve 217. The spaces between the second and third and fifth and sixth disks are greater than those between the other disks, and this is for the purpose of providing the decimal space and separating the hundreds from the thousands, and these extra spaces are formed by use of arms 220, Figs. 5 and 19, carried by a sleeve 221 on the rod 222, held in the standard 6.

The type, as shown in Fig. 5, are fixed to thin metal plates 223 of segmental form, which fit in grooves or recesses in peripheries of the disks.

The type-carriers when returned to normal position are arrested and lined up by a stop bar $121^\times$, which extends between the standards 6 through slots $122^\times$, formed in the disks, Figs. 4 and 18. A rod $58^\times$ performs a similar function for the selecting or setting-up disks, this being secured to the standards 33, Figs. 3 and 4.

Any suitable full-stroke detent may be applied to the machine. We have shown in Fig. 6 such a detent at 225, adapted to engage a toothed wheel 226, carried by the master-wheel 69. The detent is pivoted to the frame at 227, and its arm 228 lies in the path of pins 229 on the toothed wheel 226, which pins shift the detent as the stroke of the hand-lever is completed in either direction, and thus sets the same to act as a detent during the next movement of the hand-lever, thus insuring a full stroke of the hand-lever when once started in either direction. The detent is held in either position by a pivoted arm 230, which is under tension of a spring 231, said arm having inclines at its ends to engage the pin 232 on the detent, and thus complete the shifting of the same when moved by the pin 229 past the apex 233 of the arm in either direction.

The operation of the machine may be briefly described as follows: The operator strikes the key corresponding to the digits reading from the left of the number or numbers and without having to determine first the denomination of the number or numbers. Through the movement of the frame 24 and connections leading therefrom the selecting-disks will be turned forwardly, and as they reach the proper position the escapement mechanism will be released and the whole group of selectors will move toward the left to engage the gears 4, this action taking place step by step as the keys are struck in succession. Having thus positioned the selectors to set up the desired digits, the hand-lever is drawn forward, which causes the detent bars 78 78' to be withdrawn from the gears 4 and 4', and then the continued movement of the hand-lever causes the selector-disks to be turned rearwardly to normal position, which movement is communicated to the printing and adding disks, respectively, to set up the type and the digits on the adding-disks to the printing-point and display-opening, respectively. The impression is then made by the continued forward movement of the lever, the detent-bars now being in engagement, and the selectors through the described gearing and racks are shifted back to disengaged position at the right of the printing and adding disks. During this time the detent-bars remain in engagement to hold all the printing and adding disks. Having completed the forward movement of the lever, it is next pushed backward to normal position, and this movement causes the withdrawal of the detent-bars to free the printing and adding disks, and the continued backward movement of the lever causes the resetting of the printing-disks through the described gearing and also causes the carrying devices of the adding mechanism to be operated if anything is to be carried from one disk to the next. At the completion of the backward movement the detent-bars will be engaged to hold the printing and adding disks against movement until the hand-lever is again moved toward the front when another number is to be printed. As the hand-lever completes its rearward stroke the platen is moved away from the type-carriers and the printed number is displayed, the relative position of the platen and the printing-disks being specially calculated to attain this end. The inking-ribbon is directed by the frisket across the face of the type-carrier wheels.

We have used the terms "normal position" in the claims to refer to the position to which the selectors are all returned by the movement of the pick-up or set-up bar. The term "disengaged position" we have used to refer to the position occupied by the selectors at the right of the group of carriers.

We do not wish to limit ourselves to disk-shaped carriers and selectors, as other forms of such devices may be employed.

By the term "setting-up action" we mean that which the printing and adding disks are given to bring the digits to the desired point. Of course the selectors also partake of this setting-up action, these members being set up by the key connections. These selectors or members correspond in number, or substantially so, to the different orders of digits.

The rack-bars 35 35″ are in effect carriages for the selectors.

The handle 72 is a part of the setting-up means, and from the above it will be seen that the continued movement of this part after the setting-up action has been accomplished will effect the return of the selector-carriage to the right, the throwing in of the detent-bar 78, and the impression action.

The term "digit-carrier," as used in the claims herein, applies to either the adding or printing portion of the mechanism, the positioning and setting-up mechanism for one set of disks or carriers being substantially like that for the other set.

A space-key is shown at Z, whereby the escapement may be operated to shift the selectors laterally to the left. This key connects with the space-bar 31, which through the arm 32 controls the escapement and the carriage. It will be seen that the selectors both in engaging and disengaging the gears 4 4′ move in a direct line axially of the shaft, and the detent-bars serve to hold the gears to allow these actions to be performed without danger of the parts conflicting.

A coil-spring $d$, Figs. 1, 2, and 3, has one end secured to the arm 13 of the spline-bar 11 and its other end secured to the shaft 9, and this serves to hold the shaft 9 in proper relation to the sleeve or hollow shaft 8. A stop-pin $e$, Fig. 13, limits the backward rotation of the shaft 9 by acting against a shoulder $f$ on a collar carried by the shaft.

In referring to a "hand operating device" herein we mean to include any device operated manually or otherwise which will answer the purpose.

It will be seen that there is a selector for each of the digit-carriers of the printing mechanism, and in the registering mechanism there may be an additional digit-carrier, as represented in Fig. 1, and this is used in the carrying operation. There are practically, however, one of the selectors for each of the digits—that is to say, for each of the digit-carriers to which a setting-up action is directly imparted there is a selecting-wheel, and we therefore consider it proper to say that there is a selector for each digit-carrier.

We do not wish to limit ourselves to the splined connection shown for imparting to the selectors the movement of the shaft, as other forms of turning connection between shaft and selector may be used, and by the term "splined" we mean to cover any turning connection which permits an axial movement of the selectors along their supporting-shaft.

Having thus described our invention, what we claim is—

1. In combination, a series or connected succession of digit-carriers, adapted to set up a number by arranging the digits side by side, a shaft, a series of selecting-wheels one for each carrier normally disengaged from the carriers and supported on the said shaft to have movement longitudinally thereof as well as turning movement, key-levers, and connections between the key-levers and the selecting-wheels whereby the selecting-wheels may be turned according to the digit upon the key used and put into connection with the digit-carriers, substantially as described.

2. A series of normally disengaged digit-carriers, and a series of selecting-wheels corresponding thereto, one for each digit-carrier, said selecting-wheels being adapted to be turned to correspond to the number required, and to be moved into engagement with the digit-carriers, a series of key-levers adapted to turn the selecting-wheels, and means for moving the selecting-wheels into engagement with the digit-carriers after being turned by the keys.

3. A series of digit-carriers, a shaft, a series of selecting-wheels, mounted on the shaft and, when out of connection with the digit-carriers, in turning connection with the shaft, but adapted to move longitudinally on the shaft, out of turning engagement therewith and into connection with the digit-carriers in succession, a series of keys arranged to turn the shaft, according to the number on said keys, and mechanism for moving the wheels laterally step by step.

4. In a recording-machine, a shaft, a series of selecting-wheels arranged to turn with the shaft, and to be moved out of turning connection with the shaft, a series of key-levers, and mechanism intermediate the key-lever and the shaft, arranged to turn said shaft a certain part of a revolution appropriate to each key, and means for moving each wheel, in succession, out of turning engagement with the shaft and into engagement with the digit-carriers.

5. In combination a shaft, a series of selecting-wheels arranged to turn with the shaft and to be moved in succession out of turning engagement with the shaft, a series of key-levers connected with said shaft and each arranged to turn a certain part of revolution appropriate to said key, means for moving each selecting-wheel in succession out of turning engagement with the shaft, and into engagement with the printing means, and adding mechanism operated from the same shaft.

6. In combination, carriers for the type characters, a series of selectors, means for giving the selectors their selecting action by moving them into selecting position and then by successive actions into operative connection with their respective carriers, and for then operating the selectors simultaneously to set up the type characters at the point desired, substantially as described.

7. In combination, the carriers for the type or characters, a series of selectors one for each carrier with means for operating the selectors step by step from order to order and by this movement into operative connection with the carriers, before the setting-up action takes place, and means for operating the selectors to set up the desired digits, substantially as described.

8. In combination, the carriers for the digits of the different orders, a series of selecting means, the keys with connections therefrom to the selectors to operate the same into selecting position and step by step into connection with the carriers, and a hand-lever independent of the key mechanism for operating the selectors simultaneously to set up the selected digits, substantially as described.

9. In combination, the carriers for the digits of the different orders, and means for selecting the digits of the desired number by operating the keys corresponding to the digits reading from the left of the number without regard to the denomination of the number, said means comprising devices having a step-by-step movement leftward as the keys are struck, said leftward movement causing the engagement of the devices with the carriers, substantially as described.

10. In combination, the carriers for the digits, selectors with means for moving said selectors from normal position to select the desired digits and then from order to order to engage the carriers and means for returning the selectors to normal position and thus setting up the number during the return movement, substantially as described.

11. In combination, the carriers for the numbers, selectors with means for turning them from normal position and then shifting the same laterally to connect with the carriers, and means for giving the selectors a further turning movement to set up the digits selected, substantially as described.

12. In combination, the carriers for the digits, a series of selectors, means for advancing the selectors from normal position and then shifting the same laterally and immediately into connection with the carriers and means for giving the selectors a further movement to set up the characters, substantially as described.

13. In combination, the carriers for the digits, selectors, key connections thereto for turning the selectors, escapement mechanism for shifting the selectors after they are turned and means for rotating the selectors to normal position to thereby set up the number, substantially as described.

14. In combination, the carriers for the digits, a series of selectors, key connections thereto for advancing them, escapement mechanism for shifting the selectors after being advanced into operative connection with the carriers, and means for returning the selectors simultaneously to normal position to move the carriers in said returning movement, substantially as described.

15. In combination, the carriers for the digits, selectors, means for advancing the selectors, means for shifting the selectors laterally to engage with the carriers, means for returning the selectors to normal position to set up the carriers by this return movement and for then shifting the selectors laterally out of connection with the carriers, substantially as described.

16. In combination, the carriers for the digits, selectors, keys with connections for advancing the selectors, escapement means for shifting the selectors laterally to engage with the carriers, a hand-lever with connections for returning the selectors to normal position to set up the carriers by this return movement and for then shifting the selectors laterally out of connection with the carriers, substantially as described.

17. In combination, a series of carriers for the digits, a series of selectors, means for giving the selectors as a group a leftward movement as the keys are struck corresponding to the digits reading from the left toward the right of the number, and means for giving the selectors a setting-up action, said leftward movement causing the necessary number of selectors to be thrown into operative connection with the carriers, substantially as described.

18. In combination, a series of carriers for the digits, toothed selector means one for each carrier adapted to be thrown into and out of meshing connection with the carriers, key connections leading to the selector means for advancing the same into selecting position, escapement means acting after the keys and their connections to shift the advanced selector means laterally and immediately into mesh with the carrier means, and means independent of the key connections for operating the selector means for the setting up of the digits to the desired point, substantially as described.

19. In combination, carrier means for the digits, a group of connected selectors, means for disconnecting a selector from the group and simultaneously throwing it into connection with the carrier means, and means for operating the disengaged selector to set up the digit at the desired point, substantially as described.

20. In combination, carrier means for the digits, selector means, a shaft to which the selector means is connected to rotate therewith, means for freeing the selector means from the rotary movement of the shaft and for simultaneously placing the same in connection with the carrier means, and means for operating the free selector means to set up the desired digit, substantially as described.

21. In combination, carrier means for the digits selector means disengaged therefrom, a shaft supporting the selector means having a splined connection therewith, means for freeing the selector from said splined connection and for placing the same in engagement with the carrier means and means for giving the parts their setting-up action, substantially as described.

22. In combination, carrier means for the digits, selector means, a shaft for rotating the selector means having a splined connection therewith, means for moving the selector means out of connection with the spline and into connection with the carriers, and a pick-up bar with operating means therefor for effecting the setting-up action of the selector means, substantially as described.

23. In combination, the group of carrying means, the group of selectors, a shaft carrying the same having a splined connection therewith, means for moving the selectors out of connection with the spline and into connection with the carrier means and a pick-up bar common to the selectors of the group with operating means for giving the selectors their setting-up movement, substantially as described.

24. In combination, the group of carrying means, the group of selectors, a shaft having a splined connection with the selectors, the keys with connections to the shaft to rotate the same, escapement mechanism controlled by the keys to shift the selectors along the shaft out of connection with the spline and into connection with the carrier means, and means for operating the selectors when freed from the spline, substantially as described.

25. In combination, a carrier means for the digits, a selector, a shaft for turning the same, a splined connection between the shaft and selector, means for freeing the selector from the said spline, means for guiding the selector as the same moves to contact with the carrier means, driving means to operate the selector when in connection with the carriers and to withdraw the guiding means from engaging the selector, substantially as described.

26. In combination, carrier means for the digits, a selector, means for moving the same from normal position and then into selecting engagement with the carrier, means for guiding it into and holding the same in said position, operating connections for moving the selectors to set up the digits, and connections for withdrawing said guiding means from the selectors as the same begin to move, substantially as described.

27. In combination, carrier means for the digits, the series of selectors, one for each carrier, means for shifting the same into connection with the carrier means and a spline-plate for engaging and guiding only those selectors which are shifted into connection, substantially as described.

28. In combination, carrier means for the digits, a selector, a shaft having a splined connection therewith, means for freeing the selector from said spline, a spline for engaging the selector when freed from the spline of the shaft, and means for withdrawing said spline and operating the selector to effect the setting-up action, substantially as described.

29. In combination, a series of carriers for the digits, a series of selectors, one for each carrier, means for operating the selectors and a detent-bar for holding or releasing all the carriers of the series simultaneously with operating connections therefor, said connections comprising the arms carrying the bar, the shaft carrying the arms and a cam and spring for giving the shaft a rocking movement, substantially as described.

30. In combination, carriers for the digits, a separate selector for each carrier, means for moving the said selector axially in opposite directions to connect with and disconnect from the carrier, and means for giving the selectors their setting-up action, substantially as described.

31. In combination, the carrier means for the digits, a selector movable axially to connect with and to disconnect from the carrier means, and a spline for controlling the selector in its shifting movements, the said selector moving into and out of connection with said spline, substantially as described.

32. In combination, carrier means, a selector movable axially to connect with and disconnect from the carrier means, a shaft having a splined connection with the selector by which the same is turned, and a spline for controlling the selector in its shifting movements, the said selector moving into and out of connection with said spline, substantially as described.

33. In combination, carriers for the digits, a shaft, a separate selector for each carrier movable axially of the shaft in opposite directions to connect with and disconnect from the carriers, and means for holding the carriers in position while the selectors are being connected or disconnected, substantially as described.

34. In combination, carrier means for the digits, a series of selectors, a shaft having a splined connection therewith, key connections for rotating the shaft, means for shifting the selectors along the shaft to connect with the carrier means, a spline for controlling the selectors when shifted, a pick-up bar, arms carrying the same supported on the shaft, a detent-bar for holding the carrier means while the selectors are shifted or are disconnected from the carriers and means for operating the detent-bar together with the spline and pick-up bar, substantially as described.

35. In combination, a series of carriers for the digits, a selector for each carrier, a shaft therefor, the key-levers, the connections therefrom to the said shaft comprising the rack common to all the keys, a pinion, means for imparting a differential movement to the rack from the keys, and means for giving the selectors the setting-up action, substantially as described.

36. In combination, carriers for the digits, selector means, a shaft having a splined connection with the same, the keys having connections leading to the shaft, means controlled by the keys for shifting the selector, means to connect with the carriers and a hand-lever with connections to the selectors for operating the same to set up the digits, substantially as described.

37. In combination, carrier means for the digits, a series of selectors, a shaft having a splined connection with the selectors, a carriage for shifting the selectors axially, an escapement controlled from the keys for actuating said carriage, a pick-up bar, means for supporting the same on the said shaft, gearing for operating the said pick-up bar comprising gearing on the shaft and hand-operating means for actuating said gearing, substantially as described.

38. In combination, carrier means, the selectors, a shaft supporting the same, key connections to said shaft for imparting to the shaft the movements of the keys and means for preventing overthrow of said shaft comprising a toothed part and a detent, said detent being controlled from the key mechanism, substantially as described.

39. In combination, carrier means for the digits, selectors, the shaft carrying the same, a space-frame, key-levers for operating the same connections between the keys to the shaft for imparting to the shaft the different degrees of movements of the keys and a detent for preventing overthrow of the shaft with the selectors, said detent being connected with the space-frame and engaging a toothed portion carried by the shaft, substantially as described.

40. In combination, carrier means for the digits, the keys, selectors, means controlled by the keys for positioning said selectors comprising connections for advancing the selectors and a movable carriage for shifting them from order to order and by this movement into engagement with the carrier means, setting-up means for giving the selectors their setting-up action and connections extending from said setting-up means and positively operated thereby for returning the selectors to their position of rest out of engagement with the carrier means, substantially as described.

41. In combination, the keys, the carriers for the digits, rotary selectors, connections controlled by the keys whereby the selectors are rotated and moved laterally, a hand operating device, and connections therefrom to the selectors for effecting their setting-up action, substantially as described.

42. In combination, the carriers for the digits, the selectors, the keys with connections including a carriage and an escapement whereby the selectors are positioned, the hand operating device with connections whereby the selectors are given their setting-up action and connections extending from said hand operating device and positively set in motion thereby whereby the further movement of the hand operating device will return the selectors to their disengaged position, substantially as described.

43. In combination, the carrier means for the digits, a series of selectors, means for moving the selectors from normal position and into connection with the carriers, driving means whereby the selectors are returned to normal position for the setting-up action, said setting-up action taking place during said return movement, detent means for the carriers and connections whereby the further movement of the driving device of the setting-up connections will cause the detent means to be thrown into action, substantially as described.

44. In combination, carrier means for the digits, selectors, means for positioning said selectors including the key connections together with a carriage and an escapement, locking and setting-up connections, driving means for said setting-up connections, locking means for said setting-up connections whereby the parts will be held in position when set up, the said driving means having an additional movement after the setting-up actions whereby the selectors will be returned to disengaged position, substantially as described.

45. In combination, the carriers for the digits, selectors, means controlled by the keys whereby said selectors are positioned, said means including a shifting carriage, connections whereby the selectors are operated for the setting-up action, said connections including a drum 66 having a segment 65 with gearing between the same and the selectors, a lock for said gearing and connections operated from said drum after the setting-up action has taken place, said connections serving to return the selectors to disengaged position, substantially as described.

46. In combination, carrier means for the digits, selector means, connections controlled by keys for positioning said selector means, setting-up connections including a drum 66 gearing between said drum and selectors, a hand-lever, a master-wheel for operating the said drum, connections from the drum whereby the selectors will be returned to disengaged position, the said setting-up connections and selector-returning connections being actuated at different times from the said drum, substantially as described.

47. In combination, the carriers for the digits, the selectors, means controlled from the keys whereby the selectors are positioned, setting-up connections including a drum 66 with gearing between the same and the selectors, a hand-lever, a master-wheel for operating the drum, a segment on the drum for operating the setting-up gears, a locking-arm on one of the setting-up gears to engage the same, the connections for returning the selectors to disengaged position comprising a shaft 66' with means thereon which is struck by a part of the drum at a certain part of its movement, substantially as described.

48. In combination, the carriers for the digits, the selectors, a carriage for shifting the same comprising the rack-bar, the gear-wheel engaging the same, and connections for returning the carriage, said connections comprising a part on the gear and a stud to engage the same with driving means for said returning connections, whereby the stud is moved against the part on the gear, said driving means when returned to normal position removing the stud from said gear part, substantially as described.

49. In combination, carriers for the digits, selectors, a carriage for shifting said selectors, connections for returning the said carriage with the selectors to disengaged position, said connections comprising a pin 108, a stud 109 movable means by which the stud is carried, connections to the selectors for giving the same their setting-up action, driving means for said connections, and connections between the said driving means and the carrier of the stud 109 for giving said stud movement after the setting-up action has been performed, substantially as described.

50. In combination, carriers for the digits, a series of selectors, key-levers, means controlled from the key-levers to position the selectors, a pick-up bar 58 supported from the shaft of the selectors, a shaft 56, gears on said shaft meshing with gears connected with the pick-up bar and supported upon the shaft of the selectors, a spline-bar carried by the shaft of the selectors, key connections whereby the shaft is turned to actuate the splined bar and selectors, a spline-plate on the shaft 56 for engaging the selectors and driving means for the shaft 56, substantially as described.

51. In combination, the carriers for the digits, a series of selectors, setting-up connections comprising a drum 66 with gearing between the same and the selectors, a master-wheel for operating the drum, driving means for the master-wheel, detent means for the digit-carriers and a cam controlling said detent means, said cam being actuated from the master-wheel, substantially as described.

52. In combination, in an adding-machine, adding mechanism, the printing-type, carriers for said printing-type, selecting means to select the carriers in succession, means for operating said carriers simultaneously to set up the type at the printing-point, a platen movable toward and from the carriers, said platen being located to display the line of characters printed when separated from the carriers, a swinging support for the platen and the rolls carried thereby, substantially as described.

53. In combination, carrier means for the type, setting-up mechanism whereby the carriers are operated to set up the number, said mechanism including a lost-motion connection, operating means for said setting-up mechanism, adapted to have, by reason of said lost-motion connection, continued movement after the carriers are set up, a platen, and power-transmitting mechanism whereby the platen and type are made to contact, said connections extending from and being actuated by the continued movement of the operating means of the setting-up mechanism, substantially as described.

54. In combination, carriers for the type, a platen movable toward and from the carriers, setting-up connections for the carriers, having a lost-motion connection comprising the segment 65 and gear 64, a manually-operated device for actuating the setting-up connections and connections between the said device and the platen mechanism, imparting the movement of the manually-operated device positively to the platen for moving the same toward and from the said carriers, substantially as described.

55. In combination, carrier means for the type, setting-up mechanism comprising a master-wheel with connections to the carriers, means for turning the master-wheel, a platen having swinging supports therefor, the disks 93 carrying rollers 94 for swinging said supports, and connections between the said disks and master-wheel, substantially as described.

56. In combination with the type-carriers, a setting-up mechanism, the platen, swinging supports carrying the platen, paper-rollers also carried by swinging supports, means for positively returning the platen to normal position with the paper-rollers and means for turning the paper-rollers as the platen and swinging supports are returned, said means comprising the pawl 144, a lever 141 having a loose connection with part of the framework, substantially as described.

57. In combination, the carriers for the type, selectors one for each carrier, the keys, the connections between the selectors and keys whereby the selectors are turned by the movement of the keys being transmitted thereto, a carriage for shifting the selectors, an escapement controlled by the keys for shifting the carriage, setting-up connections for the selectors, detent means for the carriers, connections for returning the selectors to their disengaged position, means for taking the impression from all the carriers simultaneously, and a manually-operated device independent of the keys for operating the setting-up connections to set up the digits as selected by the operation of the keys and for operating also the selector-returning connections, the detent connections and the impression means, substantially as described.

58. In combination, the digit-carriers, the selectors, means for moving the selectors from normal position into selecting position, means for giving the selectors an additional movement to set up the carriers, said means comprising a shaft 56 and geared connections between the same and the selectors, and a geared connection between said shaft and the carriers for returning the carriers to normal position, substantially as described.

59. In combination, the carriers for the digits, a series of selectors, means for giving them different degrees of movement necessary to select the digits desired, setting-up means for giving them an additional movement to set up the digits, said set-up means including the shaft 56 and a geared connection between the same and the selectors, a cross-bar 121 operating upon all the carriers, an oscillating support for said bar, and geared connections between the said support and the shaft 56 of the setting-up means to give the said bar a full-stroke movement on each operation of the setting-up means to return all the carriers which may have been advanced from normal position back to said position, substantially as described.

60. In combination in an adding and printing machine, a series of printing-disks, a series of adding-disks, a series of selectors, one for each printing-disk, a series of selectors, one for each adding-disk, and means for positioning the selectors and for operating them to effect the setting-up action, substantially as described.

61. In combination, a series of printing-disks, a series of adding-disks, a group of selectors for the printing-disks comprising one selector for each printing-disk, a group of selectors for the adding-disks comprising one selector for each adding-disk, means for operating the selectors, said means including a clutch whereby the selectors of the adding-disks may be prevented from operating when it is desired to print the result, substantially as described.

62. In combination, the printing-disks, the adding-disks, a group of selectors for the adding-disks, a group of selectors for the printing-disks, a shaft supporting the first group, a hollow shaft or sleeve supporting the last-mentioned group, means actuated by the keys for turning the hollow shaft or sleeve and a clutch between the hollow sleeve and the shaft first mentioned whereby the selectors of the adding-disks may be prevented from operating, substantially as described.

63. In combination, the printing-disks, the adding-disks, selectors for the printing-disks, selectors for the adding-disks, means for operating the selectors of the printing-disks and for operating also the selectors of the adding-disks, the last-mentioned selectors being operated later than those of the printing-disks whereby the movement necessary to bring zero to the printing-point is without effect on the adding mechanism, substantially as described.

64. In combination, the printing-disks, the adding-disks, setting-up mechanism for said printing and adding disks with operating connections provided with slight lost motion whereby the printing-disks will be operated one space before the adding-disks are operated, substantially as described.

65. In combination, the adding-disks, the printing-disks, the shaft 9 carrying means by which the adding-disks are operated, the sleeve or hollow shaft 8 on the shaft 9 carrying means by which the printing-disks are operated means for operating the sleeve 8 and a lost-motion connection between the sleeve 8 and shaft 9, substantially as described.

66. In combination, the adding-disks, the printing-disks, the selectors 7' for the adding-disks, the shaft 9 upon which the selectors are supported, the selectors 7 for the printing-disks, the sleeve 8 upon which said selectors are supported, a disk 132'' on the shaft 9, a pin-and-slot connection between the same and the sleeve 8 and a clutch connection between the said disk and the shaft 9 with means for operating said clutch and a spring for applying pressure on the shaft 9, substantially as described.

67. In combination in an adding-machine with the adding-disks, the carrying mechanism comprising a toothed wheel, a pawl, a carrier for said pawl pivoted axially of the toothed wheel and having a tailpiece, the arm 161 arranged to be operated by a projection on one of the adding-disks and connected with the pawl-carrier and the pin-drum for operating the tailpiece of the pawl-carrier, substantially as described.

68. In combination, the adding-disks, the keys, selectors, connections controlled by the keys for advancing the selectors and then shifting them laterally into connection with the adding-disks, carrying mechanism, an operating device with connections for returning the selectors to normal position and for then shifting them laterally out of connection with the adding-disks, and connections whereby the carrying mechanism is positively operated through the return of said device to normal position, substantially as described.

69. In combination, the adding-disks, the carrying mechanism comprising the pawl, the pawl-carrier, the pin-drum arranged to operate the pawl-carrier, the connections for giving the disks their setting-up or adding movement, the hand-lever for operating said connections and connections from said hand-lever to the pin-drum, including a clutch connection whereby the pin-drum is operated only on the return of the hand-lever, substantially as described.

70. In combination, the printing mechanism comprising the platen with its movable supports, a shaft 92 having means to move the said support, means for oscillating the shaft, adding mechanism including the carrying means, and connections for operating the carrying means from the shaft 92, said connections including clutch means whereby the movement of the shaft one way will actuate the carrying means while movement in the opposite direction will not affect the carrying means, substantially as described.

71. In combination the adding and printing disks, the selectors for said disks, means controlled by the keys for positioning said selectors, a hand-lever, connections controlled thereby for giving the selectors their setting-up action, connections controlled by the lever for returning the selectors to disengaged position, means for making the impression, connections controlled by the lever for operating the impression means, carrying mechanism for the adding-disks and means operated positively through the movement of the lever for actuating the carrying mechanism, substantially as described.

72. In combination, the printing mechanism, the adding mechanism comprising a shaft, means for operating said mechanisms, a clutch splined on the shaft for disconnecting the adding mechanism and a lock for holding the adding mechanism against movement when disconnected, said lock comprising a part on the clutch engaging a fixed part of the frame, substantially as described.

73. In a machine for recording numbers and in combination a series of type-carriers, and a series of selectors corresponding thereto, and means for causing the selectors to turn and move in succession, into engagement with the type-carriers, substantially as described.

74. In a machine for recording numbers, and in combination, a series of type-carriers, a series of selectors, adapted to turn and move in succession into engagement with the type-carriers, and a series of key-levers equal in number to the number of digits, each key-lever causing the selectors to turn a determined distance, whereby any one of the selectors may be placed in engagement with any one of the type-carriers to bring the digit appropriate to the key used, into printing position, substantially as described.

75. In a machine for recording numbers and in combination a series of type-carriers, and a series of selectors corresponding thereto, means for putting any one of said selectors into engagement with said type-carriers, in position to turn said carriers to print any required digit at the will of the operator, substantially as described.

76. In combination, the carriers for the digits, rotary selector means arranged to move axially in one direction to connect with the carrier means and to move axially in the opposite direction to disconnect from the carrier means, a carriage for the selector means and operating means to give the selector means its axial connecting and axial disconnecting movement, substantially as described.

77. In combination, carriers for digits, a rotary selector, means for turning the selector about its shaft and then moving it axially into engagement with the carrier means and means for rotating the selector back to normal position and for shifting it axially out of engagement with the carrier means, substantially as described.

78. In combination, the carriers, a series of rotary selectors, a shaft for turning the selectors, means for shifting the selectors axially when turned into engagement with the carriers and out of turning engagement with the shaft, means for returning all the selectors both engaged and disengaged back to normal position and for then shifting the selectors axially out of engagement with the carriers, substantially as described.

79. In combination, a series of carriers, a series of selectors, a shaft supporting the selectors and having turning connection therewith, keys with connections for turning the selectors and escapement mechanism for shifting the selectors axially of the shaft, a hand-lever with connections for rotating the engaged selectors back to normal position, and connections from said hand-lever to the group of selectors for shifting said group to their former position, substantially as described.

80. In combination, the carriers for the digits, selectors, means for advancing the selectors from normal to selecting position and at the end of said movement causing the selectors and carriers to engage by a movement of one transversely in relation to the other, and means for operating the selectors to set up the number, the said advancing movement being in a direction at right angles to the transverse movement, substantially as described.

81. In combination, the carriers for the digits, a series of selectors, means for moving the selectors so that the first selector of the group will connect with the first carrier and at each selecting action said first selector will shift into connection with the carrier of the next higher order while the succeeding selectors will likewise shift into connection with the carriers and from the lowest to the next higher order, and means for giving the selectors their setting-up action, substantially as described.

82. In combination, carriers for the digits, selector means, and means for advancing the selector means moving it laterally into engagement with the carrier means, returning it to normal position while still engaging the carrier means and thereby effecting the setting-up action and for shifting it laterally out of engagement with the carrier means, the said advancing movement being in a direction at right angles to the transverse movement, substantially as described.

83. In combination, keys, a group of movable members, means for advancing said members by the keys, means for shifting the members step by step as a group laterally, by which movement the members in succession are freed from the group, means for moving the advanced members back to normal position and digit-carriers operated by the return of the members to normal position, substantially as described.

84. In combination, keys, a group of movable members, means for advancing said members by the keys, means for shifting the members step by step as a group laterally, by which movement the members in succession are freed from the group, means for moving the advanced members back to normal position, digit-carriers operated by the backward movement of the members and means for engaging and holding the advanced members when shifted laterally, said means being movable to release the advanced members and permit their return to normal position, substantially as described.

85. In combination, a group of rotary members, one for each order of digits, means for giving said members a forward rotation, mechanism for moving the group of members step by step laterally in relation to said means, the members being carried one by one away therefrom, a device for temporarily engaging and holding said members which have been disengaged from said means, and rotary digit-carriers to be operated by the said members, substantially as described.

86. In combination, a series of rotary members, one for each order of digits, means for holding the members against independent rotary movement, means for giving the members an axial shifting movement step by step, by which movement they are freed one by one from the group, means for rotating the freed members and digit-carriers operated by said members, substantially as described.

87. In combination, a group of members corresponding to the different orders of digits revolubly mounted side by side upon a common axis, mechanism for shifting said members laterally to be freed one by one from the group, means for rotating said members in a forward direction and a resetting-bar extending transversely to said members and engaging the same for rotating said members backward to the zero position and digit-carriers operated by said members, substantially as described.

88. In a calculating-machine, a group of rotary members upon a common axis, means for shifting the group along the said axis to free the members from the group, a resetting-bar for revolving said members in one direction, said resetting-bar extending through slots or apertures within the circumference of said members for rotating said members, a fixed bar also extending through said slots or apertures for limiting the rotation of said members, and digit-carriers operated by the freed members, substantially as described.

89. In combination, carriers for digits, key connections, a group of rotary members between the key connections and carriers, one for each order of digits, said members being rotated by said key connections, mechanism for moving the group of members step by step leftward as the keys are struck and into line with the carriers, and means for rotating the members back to normal position, the carriers being set up in this action, substantially as described.

90. In combination, digit-carriers, means for operating them consisting of rotary members one for each order of digits, means for turning the members from normal position, means for giving them a translating movement step by step, and means for returning them to normal position comprising a bar along which the members move, said bar being carried by arms movable about the axis of the rotary members and at such a distance apart to permit the translating movement, substantially as described.

91. In combination, digit-carriers, means for operating them consisting of a group of rotary members, one for each order of digits, means for turning the members from normal position, means for shifting them as a group step by step axially, means for rotating the advanced members back to normal position and for returning them axially to initial position, substantially as described.

92. In combination, keys and key connections, carriers for digits of the different orders, means for setting up said carriers comprising a group of members, means for first advancing them as the keys are struck, said group being next given a leftward movement into line with the carriers and means for returning the members from their advanced position, the carriers being set up in this returning movement, substantially as described.

93. In combination, the carriers for the digits, rotary selectors, key connections thereto for advancing the selectors, means for shifting the selectors laterally after they are advanced, and means for returning the selectors to normal position to thereby set up the number, substantially as described.

94. In combination, the carriers for the digits, rotary selectors, key connections thereto for advancing the selectors, means for shifting the selectors laterally after they are advanced, and means for returning the selectors to normal position to thereby set up the number and for reshifting the selectors, said returning and reshifting means including a hand-operated device, substantially as described.

95. In combination, digit-carriers, means for operating them comprising a group of members one for each order of digits, means for advancing them as a group, key connections for operating said means, escapement mechanism for disengaging the members one by one from the said means while in advanced position whereby said disengaged members will be free in respect to the rest of the group, and means for returning the disengaged members to normal position, substantially as described.

96. In combination in a recording and adding machine, printing mechanism including means for making the impression, adding mechanism including carrying devices, an operating-handle for setting up the adding and printing disks, a driving connection from said operating-handle to the carrying mechanism and a detachable connection between the driving connection and the impression devices whereby the printing mechanism may be rendered ineffective, substantially as described.

97. In combination in an adding and recording machine, printing mechanism including digit-carriers, adding mechanism including digit-carriers, means for setting up the digit-carriers, carrying mechanism for the adding-disks, a pin-drum for operating said carrying mechanism, a shaft for operating the pin-drum and a detachable connection between said shaft and the printing mechanism whereby the latter may be rendered effective or ineffective, substantially as described.

98. In combination, keys, a group of rotary members, means for rotating said members by the keys, means for shifting the members step by step as a group laterally, by which movement the rotary members in succession are freed from the group and means for rotating the advanced members back to normal position, substantially as described.

99. In combination, keys, a group of rotary members, means for rotating said members by the keys, means for shifting the members step by step as a group laterally, by which movement the members in succession are freed from the group, means for rotating the advanced members back to normal position, and digit-carriers operated by the return of the members to normal position, substantially as described.

100. In combination, a group of rotary members, one for each order of digits, means for giving said members, a forward rotation, mechanism for moving the group of members step by step laterally in relation to said means, the members being carried one by one away therefrom, and a device for temporarily engaging and holding said members which have been disengaged from said means, substantially as described.

101. In combination, a group of members corresponding to the different orders of digits revolubly mounted side by side upon a common axis, mechanism for shifting said members laterally to be freed one by one from the group, means for rotating said members in a forward direction and a resetting-bar extending transversely to said members and engaging the same for rotating said members backward to the zero position, substantially as described.

102. In a calculating-machine, a group of rotary members upon a common axis, means for shifting the group along the said axis to free the members from the group, a resetting-bar for revolving said members in one direction, said resetting-bar extending through slots or apertures within the circumference of said members for rotating said members, and a fixed bar also extending through said slots or apertures for limiting the rotation of said members, substantially as described.

103. In combination, digit-carriers, means for operating them consisting of a group of rotary members, one for each order of digits, means for turning the members from normal position, means for shifting them step by step axially, means for rotating the advanced members back to normal position to thereby set up the digit-carriers and for returning them axially to initial position, substantially as described.

104. In combination, keys and key connections, carriers for digits of the different orders, means for setting up said carriers comprising a group of rotary members, means for first rotating them as the keys are struck, said group being next given a leftward movement into line with the carriers and means for rotating the members back from their advanced position, the digit-carriers being set up in this returning movement, substantially as described.

105. In a machine of the class described, the combination with a movable carriage and a plurality of rotary receiving-wheels thereon, each adapted to be positioned in set-up relation without effecting any change in the relation between the remaining wheels of the group and a plurality of operating-keys adapted to set up the rotary wheels, in succession, in proportion to the numerical value of the keys, substantially as described.

106. In a machine of the class described, the combination with digit-keys and a cipher-key, of a spacing-bar adapted to be moved on the operation of any of said keys, a movable carriage, a group of wheels thereon adapted to be positioned in set-up relation in succession and without effecting any change in the relation between the remaining wheels of the group and means for spacing said carriage from the spacing-bar on the operation thereof by a key, substantially as described.

107. The combination with keys, a group of rotary members, detent means for holding them in advanced position, means for advancing said members from normal position, means for shifting them laterally, digit-carriers and means for returning the rotary members to normal position to thereby set up the number, substantially as described.

108. In combination with keys, a group of rotary members, detent means for holding them in advanced position, means for advancing said members from normal position, means for shifting them laterally, digit-carriers and means for releasing said detent means and for returning the rotary members to normal position to thereby set up the number, said means including a hand-operated device, substantially as described.

109. In combination with keys, a group of rotary members, detent means for arresting the said rotary members in succession in advanced position, means for advancing the said members from normal position, a carriage for shifting them laterally, digit-carriers, means for returning the rotary members to normal position to thereby set up the number and for reshifting the members laterally, said returning and reshifting means being rendered effective by the operation of a hand-operated device, substantially as described.

In testimony whereof we affix our signatures in presence of two witnesses.

GEORGE WILSON DUDLEY.
ARTHUR LOUIS DUDLEY.

Witnesses:
E. W. RUNKHOUSER,
W. B. TROUT.